(12) United States Patent
Sullivan et al.

(10) Patent No.: US 7,255,656 B2
(45) Date of Patent: Aug. 14, 2007

(54) MULTI-LAYER CORE GOLF BALL

(75) Inventors: Michael J. Sullivan, Barrington, RI (US); Derek A. Ladd, Acushnet, MA (US); Antonio U. DeSimas, East Providence, RI (US)

(73) Assignee: Acushnet Company, Fairhaven, MA (US)

( * ) Notice: Subject to any disclaimer, the term of this patent is extended or adjusted under 35 U.S.C. 154(b) by 134 days.

(21) Appl. No.: 10/773,906

(22) Filed: Feb. 6, 2004

(65) Prior Publication Data

US 2005/0130767 A1 Jun. 16, 2005

Related U.S. Application Data

(60) Continuation-in-part of application No. 10/341,574, filed on Jan. 13, 2003, now Pat. No. 6,852,044, which is a continuation-in-part of application No. 10/002,641, filed on Nov. 28, 2001, now Pat. No. 6,547,677, which is a continuation-in-part of application No. 09/948,692, filed on Sep. 10, 2001, which is a continuation-in-part of application No. 09/172,608, filed on Oct. 15, 1998, now Pat. No. 6,302,808, which is a division of application No. 08/943,932, filed on Oct. 3, 1997, now Pat. No. 6,056,842, said application No. 10/002,641 is a continuation-in-part of application No. 08/996,718, filed on Dec. 23, 1997, now Pat. No. 6,124,389, which is a continuation-in-part of application No. 08/746,362, filed on Nov. 8, 1996, now Pat. No. 5,810,678, which is a continuation-in-part of application No. 08/706,008, filed on Aug. 30, 1996, now Pat. No. 5,813,923, which is a continuation-in-part of application No. 08/603,057, filed on Feb. 16, 1996, now Pat. No. 5,759,676, which is a continuation-in-part of application No. 08/482,522, filed on Jun. 7, 1995, now Pat. No. 5,688,191, said application No. 10/002,641 is a continuation-in-part of application No. 09/630,387, filed on Aug. 1, 2000, now Pat. No. 6,458,892, which is a continuation-in-part of application No. 08/603,057, filed on Feb. 16, 1996, now Pat. No. 5,759,676, said application No. 10/002, 641 is a continuation-in-part of application No. 09/815,753, filed on Mar. 23, 2001, now Pat. No. 6,494,795.

(51) Int. Cl.
A63B 37/06 (2006.01)
(52) U.S. Cl. .................................................. 473/374
(58) Field of Classification Search ................ 473/373, 473/374, 376, 378, 368, 377
See application file for complete search history.

(56) References Cited

U.S. PATENT DOCUMENTS 4,431,193 A * 2/1984 Nesbitt ....................... 473/374

(Continued)

*Primary Examiner*—Raeann Trimiew
(74) *Attorney, Agent, or Firm*—Mandi B. Milbank

(57) ABSTRACT

The present invention is directed to an improved golf ball displaying the desired spin profile and having a generally rigid, thermoset polybutadiene outer core surrounding a relatively soft, low compression inner core. In general, this golf ball has an inner core and at least one outer core layer surrounding the inner core. The inner core has a hardness less than a hardness of the outer core and a specific gravity less than or equal to the outer core specific gravity. Overall the inner core compression and outer core are formulated to provide a combined overall core compression of greater than about 50, preferably greater than about 70. A cover layer is provided to surround and to cover the outer core layer. A moisture barrier layer is provided between the outer core layer and the cover layer to protect the inner and outer cores from degradation due to exposure to water. The moisture vapor transmission rate of the moisture barrier layer is selected to be less than the moisture vapor transmission rate of the cover layer.

19 Claims, 1 Drawing Sheet

U.S. PATENT DOCUMENTS

| | | | |
|---|---|---|---|
| 4,508,309 A | 4/1985 | Brown | 249/81 |
| 4,625,964 A * | 12/1986 | Yamada | 473/373 |
| 4,714,253 A * | 12/1987 | Nakahara et al. | 473/373 |
| 4,848,770 A * | 7/1989 | Shama | 473/373 |
| 4,863,167 A * | 9/1989 | Matsuki et al. | 473/373 |
| 5,048,126 A | 9/1991 | McLaughlin | 2/125 |
| 5,104,126 A | 4/1992 | Gentiluomo | 273/228 |
| 5,184,828 A | 2/1993 | Kim et al. | 273/228 |
| 5,273,286 A | 12/1993 | Sun | 273/228 |
| 5,334,673 A | 8/1994 | Wu | 273/235 R |
| 5,482,285 A | 1/1996 | Yabuki et al. | 273/228 |
| 5,490,674 A | 2/1996 | Hamada et al. | 273/228 |
| 5,743,816 A | 4/1998 | Ohsumi et al. | 473/376 |
| 5,772,531 A | 6/1998 | Ohsumi et al. | 473/376 |
| 5,824,746 A | 10/1998 | Harris et al. | 525/196 |
| 5,830,087 A * | 11/1998 | Sullivan et al. | 473/373 |
| 5,908,358 A | 6/1999 | Wu | 473/378 |
| 5,919,100 A | 7/1999 | Boehm et al. | 473/354 |
| 5,929,189 A | 7/1999 | Ichikawa et al. | 528/76 |
| 5,971,870 A | 10/1999 | Sullivan et al. | 473/373 |
| 6,025,442 A | 2/2000 | Harris et al. | 525/221 |
| 6,056,842 A | 5/2000 | Dalton et al. | 156/243 |
| 6,117,024 A | 9/2000 | Dewanjee | 473/351 |
| 6,120,393 A | 9/2000 | Sullivan et al. | 473/377 |
| 6,142,887 A | 11/2000 | Sullivan et al. | 473/373 |
| 6,210,294 B1 | 4/2001 | Wu | 473/377 |
| 6,302,808 B1 | 10/2001 | Dalton et al. | 473/371 |
| 6,309,313 B1 | 10/2001 | Peter | 473/377 |
| 6,315,682 B1 | 11/2001 | Iwami et al. | 473/374 |
| 6,390,396 B1 | 5/2002 | Takano et al. | 241/30 |
| 6,390,935 B1 | 5/2002 | Sugimoto | 473/373 |
| 6,547,677 B2 * | 4/2003 | Sullivan et al. | 473/376 |
| 6,569,036 B1 * | 5/2003 | Takemura et al. | 473/376 |
| 6,626,770 B2 * | 9/2003 | Takemura et al. | 473/371 |
| 6,852,044 B2 * | 2/2005 | Sullivan et al. | 473/376 |
| 2002/0019268 A1 | 2/2002 | Tsunoda et al. | 473/351 |

* cited by examiner

MULTI-LAYER CORE GOLF BALL

CROSS REFERENCE TO RELATED APPLICATIONS

This application is a continuation-in-part of U.S. patent application Ser. No. 10/341,574, filed Jan. 13, 2003, now U.S. Pat. No. 6,852,044, which is a continuation-in-part of U.S. patent application Ser. No. 10/002,641, filed Nov. 28, 2001, now U.S. Pat. No. 6,547,677, which is a continuation-in-part of U.S. patent application Ser. No. 09/948,692, filed Sep. 10, 2001, which is a continuation-in-part of U.S. patent application Ser. No. 09/172,608, filed Oct. 15, 1998, now U.S. Pat. No. 6,302,808, which is a division of U.S. patent application Ser. No. 08/943,932, filed Oct. 3, 1997, now U.S. Pat. No. 6,056,842; the '641 application is also a continuation-in-part of U.S. patent application Ser. No. 08/996,718, filed Dec. 23, 1997, now U.S. Pat. No. 6,124,389, which is a continuation-in-part of U.S. patent application Ser. No. 08/746,362, filed Nov. 8, 1996, now U.S. Pat. No. 5,810,678, which is a continuation-in-part of U.S. patent application Ser. No. 08/706,008, filed Aug. 30, 1996, now U.S. Pat. No. 5,813,923, which is a continuation-in-part of U.S. patent application Ser. No. 08/603,057, filed Feb. 16, 1996, now U.S. Pat. No. 5,759,676, which is a continuation-in-part of U.S. patent application Ser. No. 08/482,522, filed Jun. 7, 1995, now U.S. Pat. No. 5,688,191; the '641 application is also a continuation-in-part of U.S. patent application Ser. No. 09/630,387, filed Aug. 1, 2000 now U.S. Pat. No. 6,458,892, which is a continuation-in-part of U.S. patent application Ser. No. 08/603,057, filed Feb. 16, 1996, now U.S. Pat. No. 5,759,676; the '641 application is also a continuation-in-part of U.S. patent application Ser. No. 09/815,753, filed Mar. 23, 2001 now U.S. Pat. No. 6,494,795. The entire disclosures of these related applications are incorporated herein by reference.

FIELD OF THE INVENTION

The present is invention generally relates to golf balls and more particularly, the invention is directed to golf balls having multi-layered cores having a relatively soft, low compression inner core surrounded by a relatively rigid outer core.

BACKGROUND OF THE INVENTION

Golf balls have conventionally been constructed as either two piece balls or three piece balls. The choice of construction between two and three piece affects the playing characteristics of the golf balls. The differences in playing characteristics resulting from these different types of constructions can be quite significant.

Three piece golf balls, which are also know as wound balls, are typically constructed from a liquid or solid center surrounded by tensioned elastomeric material. Wound balls are generally thought of as performance golf balls and have a good resiliency, spin characteristics and feel when struck by a golf club. However, wound balls are generally difficult to manufacture when compared to solid golf balls.

Two piece balls, which are also known as solid core golf balls, include a single, solid core and a cover surrounding the core. The single solid core is typically constructed of a crosslinked rubber, which is encased by a cover material. For example, the solid core can be made of polybutadiene which is chemically crosslinked with zinc diacrylate or other comparable crosslinking agents. The cover protects the solid core and is typically a tough, cut-proof material such as SURLYN®, which is a trademark for an ionomer resin produced by DuPont. This combination of solid core and cover materials provides a golf ball that is virtually indestructible by golfers. Typical materials used in these two piece golf balls have a flexural modulus of greater than about 400,000 psi. In addition, this combination of solid core and cover produces a golf ball having a high initial velocity, which results in improved distance. Therefore, two piece golf balls are popular with recreational golfers because these balls provide high durability and maximum distance.

The stiffness and rigidity that provide the durability and improved distance, however, also produce a relatively low spin rate in these two piece golf balls. Low spin rates make golf balls difficult to control, especially on shorter shots such as approach shots to greens. Higher spin rates, although allowing a more skilled player to maximize control of the golf ball on the short approach shots, adversely affect driving distance for less skilled players. For example, slicing and hooking the ball are constant obstacles for the lower skill level players. Slicing and hooking result when an unintentional side spin is imparted on the ball as a result of not striking the ball squarely with the face of the golf club. In addition to limiting the distance that the golf ball will travel, unintentional side spin reduces a player's control over the ball. Lowering the spin rate of the golf ball reduces the adverse effects of unintentional side spin. Hence, recreational players typically prefer golf balls that exhibit low spin rate.

Various approaches have been taken to strike a balance between the spin rate and the playing characteristics of golf balls. For example, additional layers, such as intermediate core and cover layers are added to the solid core golf balls in an attempt to improve the playing characteristics of the ball. These multi-layer solid core balls include multi-layer core constructions, multi-layer cover constructions and combinations thereof. In a golf ball with a multi-layer core, the principal source of resiliency is the multi-layer core. In a golf ball with a multi-layer cover and single-layer core, the principal source of resiliency is the single-layer core.

In addition, varying the materials, density or specific gravity among the multiple layers of the golf ball controls the spin rate. In general, the total weight of a golf ball has to conform to weight limits set by the United States Golf Association ("USGA"). Although the total weight of the golf ball is controlled, the distribution of weight within the ball can vary. Redistributing the weight or mass of the golf ball either toward the center of the ball or toward the outer surface of the ball changes the dynamic characteristics of the ball at impact and in flight. Specifically, if the density is shifted or redistributed toward the center of the ball, the moment of inertia of the golf ball is reduced, and the initial spin rate of the ball as it leaves the golf club increases as a result of lower resistance from the ball's moment of inertia. Conversely, if the density is shifted or redistributed toward the outer surface of the ball, the moment of inertia is increased, and the initial spin rate of the ball as it leaves the golf club would decrease as a result of the higher resistance from the golf ball's moment of inertia.

The redistribution of weight within the golf ball is typically accomplished by adding fillers to one or more of the core or cover layers of the golf ball. Conventional fillers include the high specific gravity fillers, such as metal or metal alloy powders, metal oxide, metal searates, particulates, and carbonaceous materials and low specific gravity fillers, such as hollow spheres, microspheres and foamed particles. However, the addition of fillers may adversely interfere with the resiliency of the polymers used in golf balls and thereby the coefficient of restitution of the golf balls.

However, there remains a need for high performance golf balls having a multi-core and relatively soft cover for good spin profile without using ionomer.

SUMMARY OF THE INVENTION

The present invention is directed to an improved golf ball displaying the desired spin profile and having a generally rigid, thermoset polybutadiene outer core surrounding a relatively soft, low compression inner core. Preferably, this golf ball has an inner core having a compression of less than about 50 and at least one outer core layer surrounding the inner core and having a hardness of at least 80 Shore C and a specific gravity of at least 1.1. The inner core has a hardness less than a hardness of the outer core and a specific gravity less than or equal to the outer core specific gravity.

The inner core includes a polybutadiene rubber, zinc diacrylate, an organic peroxide and zinc oxide. In one embodiment, the inner core is made from about 100 pph of the polybutadiene rubber, about 34 pph of the zinc diacrylate, about 0.53 pph of the organic peroxide and a sufficient amount of the zinc oxide to produce the inner core specific gravity. The outer core includes a polybutadiene rubber, a stiffening agent, zinc diacrylate, an organic peroxide, zinc oxide and barytes filler, and in one embodiment is made from about 100 pph of the polybutadiene rubber, about 8 pph of the stiffening agent, about 0.66 pph of the organic peroxide, about 5 pph of the zinc oxide and about 35 pph of the zinc diacrylate. Suitable stiffening agents include balata and trans polyisoprene.

Overall the inner core compression and outer core are formulated to provide a combined overall core compression of greater than about 50, preferably greater than about 70. The inner core has a diameter of from about 1.4 inches to about 1.5 inches and the outer core has a thickness of from about 0.05 inches up to about 0.1 inches. Overall, the inner core and outer core have a combined overall core diameter of greater than about 1.58 inches, preferably greater than about 1.60 inches.

A cover layer is provided to surround and to cover the outer core layer. The cover layer has a thickness of from about 0.03 inches to about 0.04 inches and is constructed of either polyurea or polyurethane.

The golf ball can also include a moisture barrier layer disposed between the outer core layer and the cover layer. The moisture vapor barrier protects the inner and outer cores from degradation due to exposure to moisture, for example water, and extends the usable life of the golf ball. The moisture vapor transmission rate of the moisture barrier layer is selected to be less than the moisture vapor transmission rate of the cover layer. The moisture barrier layer has a specific gravity of from about 1.1 to about 1.2 and a thickness of less than about 0.03 inches. Suitable materials for the moisture barrier layer include a combination of a styrene block copolymer and a flaked metal, for example aluminum flake.

BRIEF DESCRIPTION OF THE DRAWINGS

In the accompanying drawing which forms a part of the specification and is to be read in conjunction therewith and in which like reference numerals are used to indicate like parts in the various views.

DETAILED DESCRIPTION OF THE PREFERRED EMBODIMENTS

Figure 1:
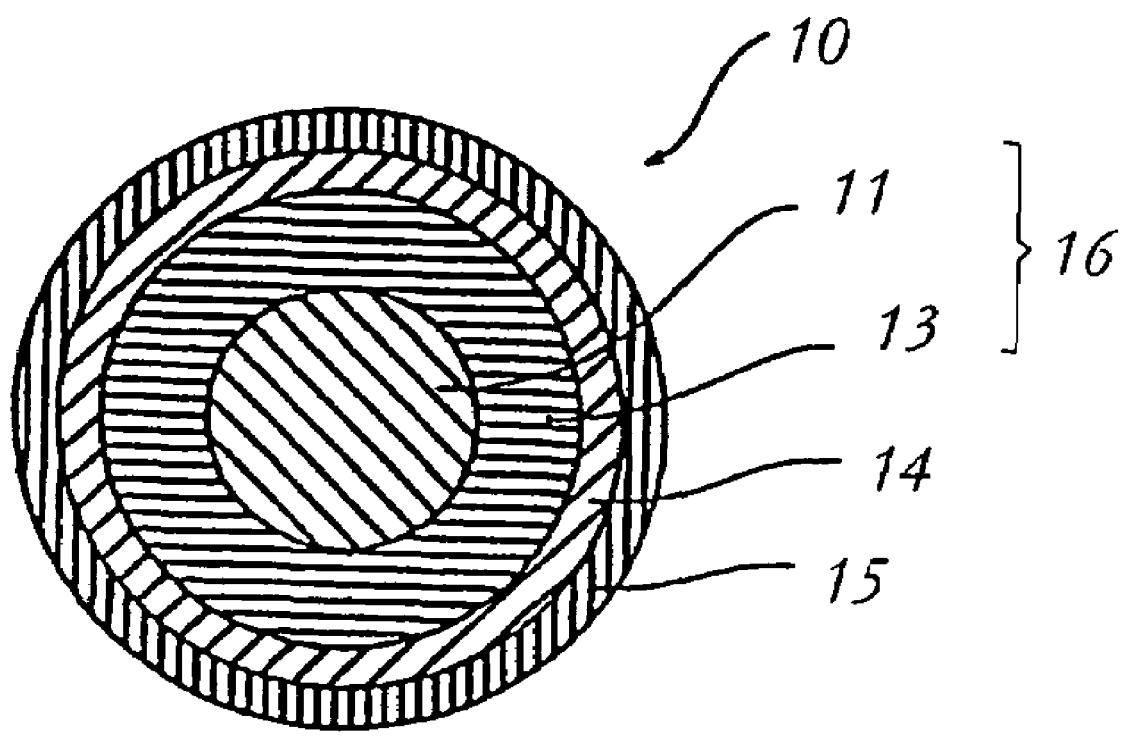
FIG. 1 is a cross-sectional representation of a golf ball formed in accordance with an embodiment of the present invention.

Referring to FIG. 1, golf ball 10 in accordance with the present invention is constructed to provide the desired spin profile and playing characteristics. In an embodiment as illustrated, golf ball 10 includes core 16 and cover layer 15 surrounding core 16. In one embodiment, the diameter of core 16 is greater than about 1.58 inches. Preferably, the diameter of core 16 is greater than about 1.6 inches. In one embodiment, the compression of core 16 is greater than about 50. In another embodiment, the compression of core 16 is greater than about 70. In yet another embodiment, the compression of core 16 is from about 80 to about 100.

As used herein, compression is measured by applying a spring-loaded force to the golf ball or golf ball component to be examined with a manual instrument (an "Atti gauge") manufactured by the Atti Engineering Company of Union City, N.J. This machine, equipped with a Federal Dial Gauge, Model D81-C, employs a calibrated spring under a known load. The sphere to be tested is forced a distance of 0.2 inch against this spring. If the spring, in turn, compresses 0.2 inch, the compression is rated at 100. If the spring compresses 0.1 inch, the compression value is rated as 0. Thus more compressible, softer materials will have lower Atti gauge values than harder, less compressible materials. Compression measured with this instrument is also referred to as PGA compression.

Core 16 includes inner core 11 and at least one outer core layer 13 surrounding inner core 11. Although illustrated as a dual layer core having a single outer core layer 13, other embodiments in accordance with the present invention can have two, three or more outer core layers. In one embodiment, an additional core layer (not shown) is provided surrounding outer core 13. This additional core layer can have a thickness of from about 0.005 inches to about 0.01 inches. In one embodiment, the specific gravity of the additional core layer is greater than about 5.

In general, inner core 11 is constructed as a relatively soft, low compression core. In one embodiment, inner core 11 includes a base rubber, a cross linking agent, an initiator and a filler. The base rubber typically includes natural or synthetic rubbers. A preferred base rubber is a polybutadiene rubber. Examples of suitable polybutadiene rubbers include BUNA® CB22 and BUNA® CB23, commercially available from Bayer of Akron, Ohio; UBEPOL® 360L and UBEPOL® 150L, commercially available from UBE Industries of Tokyo, Japan; and CARIFLEX® BCP820 and CARIFLEX® BCP824, commercially available from Shell of Houston, Tex. If desired, the polybutadiene can also be mixed with one or more additional elastomers that are known in the art such as natural rubber, polyisoprene rubber and styrene-butadiene rubber in order to modify the properties of inner core 11. In one embodiment, the base rubber is present in an amount of about 100 parts per hundred ("pph").

Suitable cross linking agents include metal salts, such as a zinc salt or a magnesium unsaturated fatty acid, such as acrylic or methacrylic acid, having 3 to 8 carbon atoms. Examples include, but are not limited to, metal salt diacrylates, dimethacrylates, and monomethacrylates, wherein the metal is magnesium, calcium, zinc, aluminum, sodium, lithium, or nickel. Suitable acrylates include zinc acrylate, zinc diacrylate, zinc methacrylate, zinc dimethacrylate, and mixtures thereof. Preferably, the cross linking agent is zinc diacrylate. In one embodiment, the zinc diacrylate is provided as zinc diacrylate pellets having an 80% zinc diacrylate content. The cross linking agent is typically present in an amount greater than about 10 pph of the base rubber, preferably from about 20 to 40 pph of the base rubber, more preferably from about 25 to 35 pph of the base rubber. In one embodiment, the cross linking agent is present in an amount greater than about 25 pph. In another embodiment, the cross linking agent is present in an amount of about 34 pph.

The initiator agent can be any known polymerization initiator that decomposes during the cure cycle. Suitable initiators include organic peroxide compounds, for example dicumyl peroxide; 1,1-di(t-butylperoxy) 3,3,5-trimethyl cyclohexane; α,α-bis(t-butylperoxy)diisopropylbenzene; 2,5-dimethyl-2,5 di(t-butylperoxy)hexane; di-t-butyl peroxide; and mixtures thereof. Other examples include, but are not limited to, VAROX® 231XL and Varox® DCP-R, commercially available from Elf Atochem of Philadelphia, Pa.; PERKODOX® BC and PERKODOX® 14, commercially available from Akzo Nobel of Chicago, Ill.; and ELASTOCHEM® DCP-70, commercially available from Rhein Chemie of Trenton, N.J. A preferred organic peroxide initiator is Trigonox®, commercially available from Akzo Nobel Polymer Chemicals bv of Amersfoort, Netherlands. Suitable initiator levels include initial concentrations up to about 1 pph. In one embodiment, the initiator is present in an amount of greater than 0.5 pph. In another embodiment, the initiator level is about 0.53 pph.

Fillers added to one or more portions of the golf ball typically include processing aids or compounds to affect rheological and mixing properties, density-modifying fillers, tear strength modifiers, reinforcement fillers, and the like. The fillers are generally inorganic, and suitable fillers include numerous metals or metal oxides, such as zinc oxide and tin oxide, as well as barium sulfate, barytes, zinc sulfate, calcium carbonate, barium carbonate, clay, tungsten, tungsten carbide, an array of silicas, and mixtures thereof. Fillers may also include various foaming agents or blowing agents that may be readily selected by one of ordinary skill in the art. Fillers can include polymeric, ceramic, metal, and glass microspheres and can be solid or hollow, and filled or unfilled. Fillers are typically also added to one or more portions of the golf ball to modify the density thereof to conform to uniform golf ball standards. Preferably, inner core 11 contains zinc oxide as the filler. The filler is present in an amount sufficient to produce the desired specific gravity in inner core 11. In one embodiment, inner core 11 can include unfilled or foamed density reducing material to reduce the specific gravity of the inner core 11, increasing the moment of inertia of golf ball 10.

The constituents and constituent concentrations of inner core 11 are selected to produce the desired physical characteristics. Inner core 11 is selected to have a compression of less than about 70, preferably less than about 65, more preferably less than about 50. The hardness of inner core 11 is selected to be less than the hardness of outer core 13. In one embodiment, the hardness of inner core 11 is from about 70 to about 80 Shore C. Preferably, the hardness of inner core 11 is less than about 80 Shore C, for example about 78 Shore C. Inner core 11 has a specific gravity of less than about 1.13, for example from about 1 to about 1.1 or about 1.05. The coefficient of restitution of inner core 11 is from about 0.8 to about 0.825, preferably about 0.812. As used herein, the term "coefficient of restitution" ("COR") for golf balls is defined as the ratio of the rebound velocity to the inbound velocity when balls are fired into a rigid plate. A discussion of COR and suitable test methods for measuring COR can be found, for example, in U.S. Pat. No. 6,547,677 B2, which is incorporated herein by reference. Inner core 11 is constructed to have a diameter of at least about 1 inch. In one embodiment, the diameter of inner core 11 is from about 1.4 inches up to about 1.5 inches. In another one embodiment, the diameter of inner core 11 is about 1.457 inches.

Outer core 13 surrounds inner core 11 and is constructed to be more rigid than inner core 11. In one embodiment, outer core 13 includes a base rubber, a cross linking agent, an initiator, one or more fillers and, alternatively, a stiffening agent. Suitable base rubbers, cross linking agents, initiators and fillers are the same as those for inner core 11. In one embodiment the base rubber is a thermoset polybutadiene. The base rubber is present in an amount of about 100 pph. Zinc diacrylate is a preferred cross linking agent. In one embodiment, the cross linking agent is present in an amount of greater than 35 pph. In another embodiment, the amount of cross linking agent is greater than about 40 pph. In yet another embodiment, the cross linking agent is present in an amount of about 53 pph. Preferably, the initiator is an organic peroxide. In one embodiment, the organic peroxide is present in an amount greater than about 0.6 pph. In another embodiment, the organic peroxide is present in an amount of about 0.66 pph. A preferred filler is zinc oxide. In another embodiment, the filler also includes barytes. Fillers are added in an amount sufficient to impart the desired weight and physical characteristics, for example specific gravity, to outer core 13. In one embodiment, the filler can be present in an amount of about 5 pph.

Suitable stiffening agents to be used in outer core 13 include balata and trans polyisoprene. Preferably, the stiffening agent is balata. These stiffening agents are commercially available under the tradenames TP251 and TP301. The stiffening agents are added to outer core 13 in an amount of from about 5 pph to about 10 pph. In one embodiment, the stiffening agent is present in an amount of about 8 pph.

As with inner core 11, the constituents and constituent concentrations of outer core 13 are selected to produce the desired physical characteristics. In one embodiment, outer core 13 has a compression of about 90. In another embodiment the compressions of the inner and outer cores are selected to provided a combined dual core compression of from about 80 up to about 100. The hardness of outer core 13 is selected to be greater than or equal to about 80 Shore C. Preferably, the hardness is greater than or equal to 90 Shore C. In one embodiment, the flex modulus (per ASTM D-790) of outer core 13 is greater than about 30,000 psi. Outer core 13 has a specific gravity that is greater than or equal to the specific gravity of inner core 11. In one embodiment, the specific gravity of outer core 13 is greater than or equal to 1.1. In another embodiment, the specific gravity of outer core 13 is greater than or equal to 1.13. In yet another embodiment, the specific gravity of outer core 13 is about 1.24. Having the specific gravity of outer core 13 greater than the specific gravity of inner core 11 increases the moment of inertia and lowers the spin rate of golf ball 10.

In one embodiment, the coefficient of restitution of outer core 13 is about 0.824. In another embodiment, the coefficient of restitution of the inner and outer core are selected to produce a combined dual core coefficient or restitution of from about 0.805 to about 0.83. Outer core 13 has a thickness of from about 0.05 inches up to about 0.1 inches. In one embodiment, outer core 13 has a thickness of about 0.075 inches. In general the diameter of inner core 11 and thickness of outer core 13 are selected to produce a diameter for core 16 that is greater than about 1.58 inches, preferably greater than about 1.6 inches.

When golf ball 10 includes multiple outer core layers, each outer core layer can include the same materials as disclosed above for the inner core 11 and outer core 13, or different compositions. In one embodiment, at least one outer core layer is substantially stiffer and harder than inner core 11. In one embodiment, each one of the outer cores has a thickness of from about 0.001 inches to about 0.1 inches, preferably from about 0.01 inches to about 0.05 inches.

Cover layer 15 surrounds outer core 13. Cover layer 15 can include any materials known to those of ordinary skill in the art, including thermoplastic and thermosetting materials, but preferably the cover layer can include any suitable materials, such as:

(1) Polyurethanes, such as those prepared from polyols and diisocyanates or polyisocyanates and those disclosed in U.S. Pat. Nos. 5,334,673 and 6,506,851 and U.S. patent application Ser. No. 10/194,059;

(2) Polyureas, such as those disclosed in U.S. Pat. No. 5,484,870 and U.S. patent application Ser. Nos. 60/401,047 and 10/228,311; and (3) Polyurethane-urea hybrids, blends or copolymers comprising urethane and urea segments.

Cover layer 15 preferably includes a polyurethane composition comprising the reaction product of at least one polyisocyanate and at least one curing agent. The curing agent can include, for example, one or more diamines, one or more polyols, or a combination thereof. The at least one polyisocyanate can be combined with one or more polyols to form a prepolymer, which is then combined with the at least one curing agent. Thus, when polyols are described herein they may be suitable for use in one or both components of the polyurethane material, i.e., as part of a prepolymer and in the curing agent. The polyurethane composition may be used in forming the inner cover, outer cover, or both. In one preferred embodiment, the outer cover includes the polyurethane composition.

In a different preferred embodiment, the curing agent includes a polyol curing agent. In a more preferred embodiment, the polyol curing agent includes ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(β-hydroxyethyl)ether; hydroquinone-di-(β-hydroxyethyl)ether; trimethylol propane, or mixtures thereof.

In one embodiment, the polyurethane composition includes at least one isocyanate and at least one curing agent. In yet another embodiment, the polyurethane composition includes at least one isocyanate, at least one polyol, and at least one curing agent. In a preferred embodiment, the isocyanate includes 4,4'-diphenylmethane diisocyanate, polymeric 4,4'-diphenylmethane diisocyanate, carbodiimide-modified liquid 4,4'-diphenylmethane diisocyanate, 4,4'-dicyclohexylmethane diisocyanate, p-phenylene diisocyanate, toluene diisocyanate, isophoronediisocyanate, p-methylxylene diisocyanate, m-methylxylene diisocyanate, o-methylxylene diisocyanate, or a mixture thereof. In another preferred embodiment, the at least one polyol includes a polyether polyol, hydroxy-terminated polybutadiene, polyester polyol, polycaprolactone polyol, polycarbonate polyol, or mixtures thereof. In yet another preferred embodiment, the curing agent includes a polyamine curing agent, a polyol curing agent, or a mixture thereof. In a more preferred embodiment, the curing agent includes a polyamine curing agent. In a most preferred embodiment, the polyamine curing agent includes 3,5-dimethylthio-2,4-toluenediamine, or an isomer thereof; 3,5-diethyltoluene-2,4-diamine, or an isomer thereof; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); trimethylene glycol-di-p-aminobenzoate; polytetramethyleneoxide-di-p-aminobenzoate; N,N'-dialkyldiamino diphenyl methane; p,p'-methylene dianiline; phenylenediamine; 4,4'-methylene-bis-(2-chloroaniline); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); or mixtures thereof.

Any polyisocyanate available to one of ordinary skill in the art is suitable for use according to the invention. Exemplary polyisocyanates include, but are not limited to, 4,4'-diphenylmethane diisocyanate ("MDI"), polymeric MDI, carbodiimide-modified liquid MDI, 4,4'-dicyclohexylmethane diisocyanate ("$H_{12}$MDI"), p-phenylene diisocyanate ("PPDI"), toluene diisocyanate ("TDI"), 3,3'-dimethyl-4,4'-biphenylene diisocyanate ("TODI"), isophoronediisocyanate ("IPDI"), hexamethylene diisocyanate ("HDI"), naphthalene diisocyanate ("NDI"); xylene diisocyanate ("XDI"); para-tetramethylxylene diisocyanate ("p-TMXDI"); meta-tetramethylxylene diisocyanate ("m-TMXDI"); ethylene diisocyanate; propylene-1,2- diisocyanate; tetramethylene-1,4-diisocyanate; cyclohexyl diisocyanate; 1,6-hexamethylene-diisocyanate ("HDI"); dodecane-1,12-diisocyanate; cyclobutane-1,3-diisocyanate; cyclohexane-1,3-diisocyanate; cyclohexane-1,4-diisocyanate; 1-isocyanato-3,3,5-trimethyl-5-isocyanatomethylcyclohexane; methyl cyclohexylene diisocyanate; triisocyanate of HDI; triisocyanate of 2,4,4-trimethyl-1,6-hexane diisocyanate ("TMDI"), tetracene diisocyanate, naphthalene diisocyanate, anthracene diisocyanate, and mixtures thereof. Polyisocyanates are known to those of ordinary skill in the art as having more than one isocyanate group, e.g., di-, tri-, and tetra-isocyanate. Preferably, the polyisocyanate includes MDI, PPDI, TDI, or a mixture thereof, and more preferably, the polyisocyanate includes MDI. It should be understood that, as used herein, the term "MDI" includes 4,4'-diphenylmethane diisocyanate, polymeric MDI, carbodiimide-modified liquid MDI, and mixtures thereof and, additionally, that the diisocyanate employed may be "low free monomer," understood by one of ordinary skill in the art to have lower levels of "free" monomer isocyanate groups than conventional diisocyanates, i.e., the compositions of the invention typically have less than about 0.1% free monomer groups. Examples of "low free monomer" diisocyanates include, but are not limited to Low Free Monomer MDI, Low Free Monomer TDI, and Low Free Monomer PPDI.

The at least one polyisocyanate should have less than about 14% unreacted NCO groups. Preferably, the at least one polyisocyanate has no greater than about 7.5% NCO, more preferably, from about 2.5% to about 7.5%, and most preferably, from about 4% to about 6.5%.

Any polyol available to one of ordinary skill in the art is suitable for use according to the invention. In one embodiment, the molecular weight of the polyol is from about 200 to about 6000. Exemplary polyols include, but are not limited to, polyether polyols, hydroxy-terminated polybutadiene (including partially/fully hydrogenated derivatives), polyester polyols, polycaprolactone polyols, and polycarbonate polyols. Examples include, but are not limited to, polytetramethylene ether glycol ("PTMEG"), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

In another embodiment, polyester polyols are included in the polyurethane material of the invention. Suitable polyester polyols include, but are not limited to, polyethylene adipate glycol, polybutylene adipate glycol, polyethylene propylene adipate glycol, ortho-phthalate-1,6-hexanediol, and mixtures thereof. The hydrocarbon chain can have saturated or unsaturated bonds, or substituted or unsubstituted aromatic and cyclic groups.

In another embodiment, polycaprolactone polyols are included in the materials of the invention. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, and mixtures thereof. The hydrocarbon chain can have saturated or unsaturated bonds, or substituted or unsubstituted aromatic and cyclic groups.

In yet another embodiment, the polycarbonate polyols are included in the polyurethane material of the invention. Suitable polycarbonates include, but are not limited to, polyphthalate carbonate. The hydrocarbon chain can have saturated or unsaturated bonds, or substituted or unsubstituted aromatic and cyclic groups.

Polyamine curatives are also suitable for use in the curing agent of the polyurethane composition of the invention and have been found to improve cut, shear, and impact resistance of the resultant balls. Preferred polyamine curatives include, but are not limited to, 3,5-dimethylthio-2,4-toluenediamine and isomers thereof; 3,5-diethyltoluene-2,4-diamine and isomers thereof, such as 3,5-diethyltoluene-2,6-diamine; 4,4'-bis-(sec-butylamino)-diphenylmethane; 1,4-bis-(sec-butylamino)-benzene, 4,4'-methylene-bis-(2-chloroaniline); 4,4'-methylene-bis-(3-chloro-2,6-diethylaniline); polytetramethyleneoxide-di-p-aminobenzoate; N,N'-dialkyldiamino diphenyl methane; p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline); 4,4'-diamino-3,3'-diethyl-5,5'-dimethyl diphenylmethane; 2,2',3,3'-tetrachloro diamino diphenylmethane; 4,4'-methylene-bis-(3-chloro-2,6-diethylaniline); trimethylene glycol di-p-aminobenzoate; and mixtures thereof. Preferably, the curing agent of the present invention includes 3,5-dimethylthio-2,4-toluenediamine and isomers thereof, such as ETHACURE 300. Suitable polyamine curatives, which include both primary and secondary amines, preferably have weight average molecular weights ranging from about 64 to about 2000.

At least one of a diol, triol, tetraol, or hydroxy-terminated curative may be added to the aforementioned polyurethane composition. Suitable diol, triol, and tetraol groups include ethylene glycol; diethylene glycol; polyethylene glycol; propylene glycol; polypropylene glycol; lower molecular weight polytetramethylene ether glycol; 1,3-bis(2-hydroxyethoxy)benzene; 1,3-bis-[2-(2-hydroxyethoxy)ethoxy]benzene; 1,3-bis-{2-[2-(2-hydroxyethoxy)ethoxy]ethoxy}benzene; 1,4-butanediol; 1,5-pentanediol; 1,6-hexanediol; resorcinol-di-(4-hydroxyethyl)ether; hydroquinone-di-(4-hydroxyethyl)ether; and mixtures thereof. Preferred hydroxy-terminated curatives include ethylene glycol; diethylene glycol; 1,4-butanediol; 1,5-pentanediol; 1,6-hexanediol, trimethylol propane, and mixtures thereof.

Preferably, the hydroxy-terminated curatives have molecular weights ranging from about 48 to 2000. It should be understood that molecular weight, as used herein, is the absolute weight average molecular weight and would be understood as such by one of ordinary skill in the art.

Both the hydroxy-terminated and amine curatives can include one or more saturated, unsaturated, aromatic, and cyclic groups. Additionally, the hydroxy-terminated and amine curatives can include one or more halogen groups. The polyurethane composition can be formed with a blend or mixture of curing agents. If desired, however, the polyurethane composition may be formed with a single curing agent.

Any method known to one of ordinary skill in the art may be used to combine the polyisocyanate, polyol, and curing agent of the present invention. One commonly employed method, known in the art as a one-shot method, involves concurrent mixing of the polyisocyanate, polyol, and curing agent. This method results in a mixture that is inhomogenous (more random) and affords the manufacturer less control over the molecular structure of the resultant composition. A preferred method of mixing is known as a prepolymer method. In this method, the polyisocyanate and the polyol are mixed separately prior to addition of the curing agent. This method affords a more homogeneous mixture resulting in a more consistent polymer composition.

The thickness of cover layer 15 is from about 0.03 inches up to about 0.04 inches. In one embodiment, the thickness of cover layer 15 is about 0.035 inches. In one embodiment, the cover layer has a hardness of less than about 65 Shore D. Although illustrated as having a single cover layer, golf ball 10 can have two or more cover layers to fine tune the spin and feel of golf ball 10.

In one embodiment, golf ball 10 also includes moisture barrier layer 14 disposed between outer core 13 and cover layer 14. In one embodiment, moisture barrier layer 14 comprises at least one of the plurality of outer core layers. In another embodiment, moisture barrier layer 14 is a separate layer independent of the plurality of outer core layers. Moisture barrier layer 14 is selected to maintain the playing characteristics and initial velocity of golf ball 10 as the golf ball ages. In one embodiment, moisture barrier layer 14 is selected to have a moisture vapor transmission rate that is less than a moisture vapor transmission rate of cover layer 15. This inhibits moisture from entering into inner core 11 and outer core 13 and adversely affecting the properties of those layers. Examples of suitable moisture barrier layers 14 are disclosed in U.S. Pat. No. 6,632,147. The entire disclosure of this patent is incorporated herein by reference.

In general, moisture barrier layer 14 has a moisture vapor transmission rate that is lower than that of the cover layer 15, and more preferably less than the moisture vapor transmission rate of an ionomer resin, which is in the range of about 0.45 to about 0.95 gram-mm/m$^2$-day. The moisture vapor transmission rate is defined as the mass of moisture vapor that diffuses into a material of a given thickness per unit area per unit time. The preferred standards of measuring the moisture vapor transmission rate include ASTM F1249-90 entitled "Standard Test Method for Water Vapor Transmission Rate Through Plastic Film and Sheeting Using a Modulated Infrared Sensor," and ASTM F372-99 entitled "Standard Test Method for Water Vapor Transmission Rate of Flexible Barrier Materials Using an Infrared Detection Technique," among others.

Moisture barrier layer 14 includes a styrene block co-polymer. Suitable styrene block co-polymers are available under the tradename Kraton® from Kraton Polymers of Houston, Tex. In addition, moisture vapor barrier layer 14 also has micro particles disposed therein. These particles are preferably hydrophobic and create a more tortuous path across moisture vapor barrier layer 14 to reduce the moisture transmission rate of layer 14. The micro particles may include nano particles, ceramic particles, flaked glass, and flaked metals (e.g., micaceous materials, iron oxide or aluminum). In one embodiment, moisture barrier layer 14 includes aluminum flake.

The constituents, formulations and thickness of moisture barrier layer 14 are selected to provide the desired moisture transmission rate. In one embodiment, moisture barrier layer 14 has a specific gravity of from about 1 to about 2. In another embodiment, moisture barrier layer 14 has a specific gravity of about 1.13. The thickness of moisture barrier layer 14 is less than about 0.03 inches. In one embodiment, the thickness of moisture barrier layer 14 is about 0.024 inches.

The arrangements and formulations of golf ball 10 are summarized in the following table:

tion Ser. No. 10/341,574, which has been incorporated herein by reference, and U.S. Pat. No. 6,547,677, which is incorporated herein in its entirety.

While it is apparent that the illustrative embodiments of the invention herein disclosed fulfill the objectives stated above, it will be appreciated that numerous modifications and other embodiments may be devised by those skilled in the art. Therefore, it will be understood that the appended claims are intended to cover all such modifications and embodiments which come within the spirit and scope of the present invention.

What is claim is:

1. A golf ball comprising:
   an inner core having a compression of less than about 65;
   at least one outer core layer surrounding the inner core having a specific gravity greater than or equal to a specific gravity of the inner core; and
   a cover surrounding the outer core layer;
   wherein the inner core hardness is about 78 Shore C and the outer core hardness is greater than about 90 Shore C; and

|  | Inner Core | Outer core Layer | Multi-Layer Core | Moisture Barrier Layer | Cover Layer |
|---|---|---|---|---|---|
| Property | | | | | |
| Hardness | <outer core layer; <80 Shore C; about 78 Shore C | >80 Shore C; >90 Shore C | — | — | <65 Shore D |
| Compression | <70; <65; <50 | 80–100; 90 | >50; >70; 80–100 | — | — |
| Specific Gravity | 1–1.1; 1.05; <1.13 | >s.g. of inner core; >1.1; 1.24 | — | 1–2; 1.13 | — |
| Diameter | 1.4"–1.5"; 1.457" | — | >1.58"; >1.6" | — | — |
| Thickness | — | 0.05"–0.1"; 0.075" | — | <0.030"; 0.024" | 0.03"–0.04"; 0.035" |
| COR | 0.8–0.825; 0.812 | 0.824 | 0.805–0.83 | — | — |
| MATERIAL | | | | | |
| CB23 | 100 pph | 100 pph | — | — | — |
| TP301 | — | 8 pph | — | — | — |
| Zinc Diacrylate | >25 pph; 34 pph | >35 pph; >40 pph; 53 pph | — | — | — |
| Trigonox ® | >0.5 pph; 0.53 pph | >0.6 pph; 0.66 pph | — | — | — |
| Filler/Zinc Oxide | Sufficient to produce s.g. | Sufficient to produce s.g.; 5 pph | — | — | — |
| Barytes Filler | — | To weight | — | — | — |
| Kraton FG | — | — | — | Per Formulation | — |
| Aluminum Flake | — | — | — | Per Formulation | — |
| Polyurea/Polyurethane | — | — | — | — | Per Formulation |

Golf ball 10 can be constructed by any known method that is generally known and available in the art. Suitable methods include methods for formulating and mixing the constituents of the various layers of golf ball 10. These methods also include methods for forming golf ball 10 including compression molding and injection molding. Examples of these methods can be found, for example, in U.S. patent applicawherein the inner core has a diameter of from about 1.4 inches to about 1.5 inches and the outer core has a thickness of from about 0.05 inches up to about 0.1 inches.

2. The golf ball of claim 1, wherein the cover layer comprises polyurea or polyurethane.

3. The golf ball of claim 1, further comprising a moisture barrier layer disposed between the outer core layer and the cover layer, wherein the moisture barrier layer comprises a moisture vapor transmission rate that is less than a moisture vapor transmission rate of the cover layer.

4. The golf ball of claim 3, wherein the moisture barrier layer has a specific gravity of from about 1 to about 2, and a thickness of less than about 0.03 inches.

5. The golf ball of claim 3, wherein the moisture barrier layer comprises a styrene block copolymer and aluminum flake.

6. A golf ball comprising:
a multi-layer core comprising:
an inner core having a Shore C hardness less than about 80 and a compression of less than about 70; and
at least one outer core layer having a Shore C hardness of greater than about 80,
an amount of zinc diacrylate of greater than about 35 pph; and
a cover layer having a Shore D hardness of less than about 65;
wherein at least one outer core layer has a moisture vapor transmission rate that is lower than that of the cover layer, and the multi-layer core has a diameter of greater than about 1.58 inches.

7. The golf ball of claim 6, wherein the outer core layer has a Shore C hardness of greater than about 90.

8. The golf ball of claim 7, wherein the zinc diacrylate level in the outer core layer is greater than about 40 pph.

9. The golf ball of claim 7, wherein the multi-layer core diameter is greater than about 1.6 inches.

10. The golf ball of claim 7, wherein the inner core comprises about 100 pph of a polybutadiene rubber, greater than about 25 pph of a zinc diacrylate, greater than about 0.5 pph of an organic peroxide and a sufficient amount of filler to produce the inner core specific gravity, the outer core comprises about 100 pph of a polybutadiene rubber, greater than about 0.6 pph of an organic peroxide, a sufficient amount of filler to produce the outer core specific gravity, and the cover layer comprises polyurea or polyurethane.

11. A golf ball comprising:
an inner core having a compression of less than about 65;
at least one outer core layer surrounding the inner core and having a hardness of at least 80 Shore C and a specific gravity greater than or equal to a specific gravity of the inner core; and
a cover surrounding the outer core layer;
wherein the inner core has a hardness less than a hardness of the outer core, and
wherein the cover layer comprises polyurea or polyurethane.

12. The golf ball of claim 11, wherein the inner core has a diameter of from about 1.4 inches to about 1.5 inches and the outer core has a thickness of from about 0.05 inches up to about 0.1 inches.

13. The golf ball of claim 11, wherein the cover layer has a thickness of from about 0.03 inches to about 0.04 inches.

14. The golf ball of claim 11, wherein the inner core has a compression of less than about 50.

15. The golf ball of claim 11, wherein the outer core layer has a specific gravity of at least 1.1.

16. The golf ball of claim 11, wherein the golf ball further comprises a moisture barrier layer disposed between the outer core layer and the cover layer, wherein the moisture barrier layer comprises a moisture vapor transmission rate that is less than a moisture vapor transmission rate of the cover layer.

17. The golf ball of claim 16, wherein the moisture barrier layer has a specific gravity of from about 1 to about 2.

18. The golf ball of claim 17, wherein the moisture barrier layer has a thickness of less than about 0.03 inches.

19. The golf ball of claim 16, wherein the moisture barrier layer comprises a styerene block copolymer and aluminum flake.

* * * * *